Nov. 14, 1950     B. G. GALLASCH     2,530,352

MICROSCOPE

Filed Oct. 18, 1946     3 Sheets-Sheet 1

B. G. GALLASCH
Inventor

Attorney

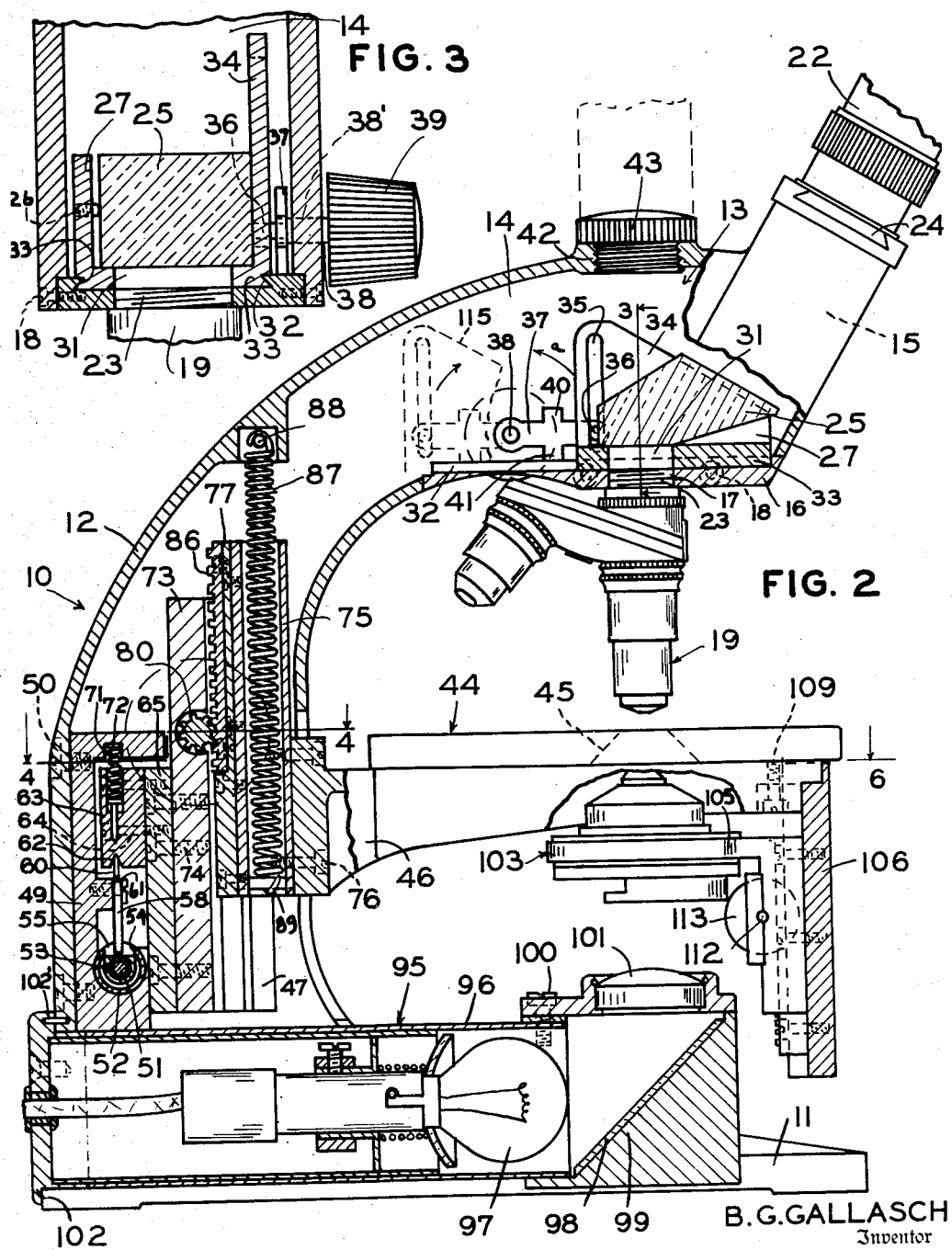

Nov. 14, 1950  B. G. GALLASCH  2,530,352
MICROSCOPE

Filed Oct. 18, 1946  3 Sheets-Sheet 3

B. G. GALLASCH
Inventor

Attorney

Patented Nov. 14, 1950

2,530,352

UNITED STATES PATENT OFFICE 2,530,352

MICROSCOPE

Bernhardt George Gallasch, Rochester, N. Y., assignor to Bausch & Lomb Optical Company, Rochester, N. Y., a corporation of New York Application October 18, 1946, Serial No. 704,209

3 Claims. (Cl. 88—39)

1

This invention relates to microscopes and has for its chief object the provision of an instrument which is relatively simple in structure yet efficient in operation. A further object is to provide a microscope of the binocular type which may be readily converted to the monocular type. Another object is to provide a microscope in which the parts are arranged so as to afford a maximum of convenience and comfort to the user. A further object is to provide means for selectively locking a movable slide on a microscope stand.

These and other objects and advantages reside in certain novel features of construction, arrangement and combination of parts as will hereinafter be more fully explained and pointed out in the appended claims.

With reference to the drawings:

Fig. 2 is a vertical sectional view thereof with parts in elevation,

Fig. 3 is a sectional view taken on the line 3—3 of Fig. 2,

Figure 1:
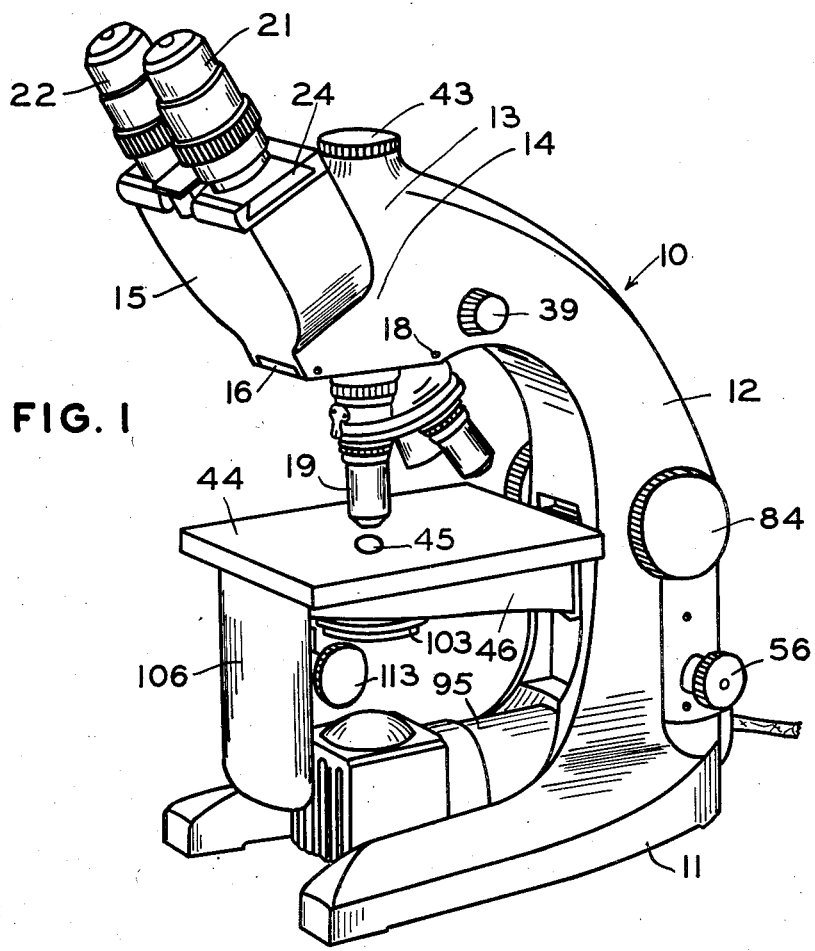
Fig. 1 is a general perspective view of a microscope embodying my invention.

Among the novel features of the present invention is the rigid unitary stand designated generally by the numeral 10 in Figs. 1 and 2 comprising a base 11, a hollow arm 12, and an integral chamber or head portion 13 for housing optical members at the upper end of the arm 12. The chamber 13 is composed of a longitudinal portion 14 extending along the arm 12 at its upper end and opening into an open-ended crosswise portion 15 extending angularly upward from chamber 14. Longitudinal chamber 14 is provided with a removable bottom wall or plate 16 having a threaded opening 17 and is fixed to the hollow arm 12 in any suitable manner such as by the screws 18.

Optical means supported by the stationary arm 12 are provided for forming an enlarged image of a specimen under examination comprising an objective 19 and binocular eyepieces 21 and 22. The objective may be of the multiple type as illustrated and is supported from the plate 16 by means of the threaded tube 23 integral with objective 19 engaging within the opening 17. Across the open end of the angular chamber 15, the binocular eyepieces 21 and 22 are fixed in

Figure 5:
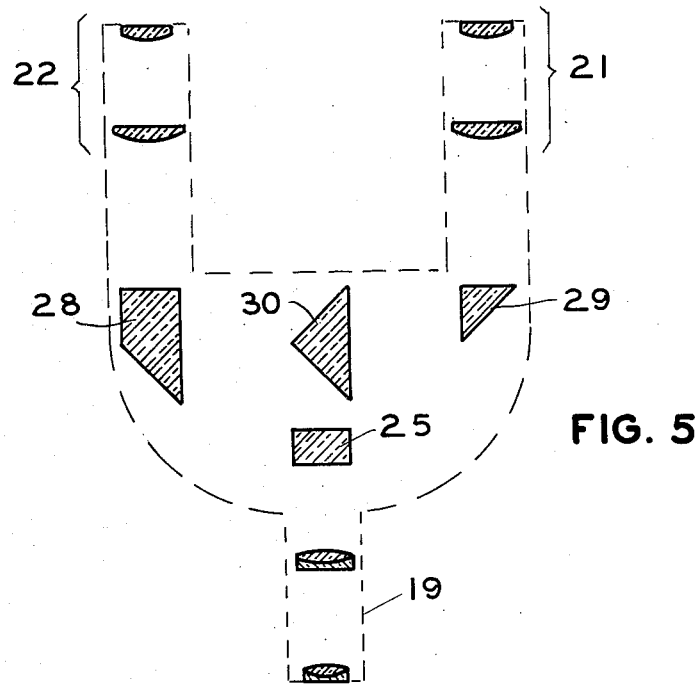
Fig. 5 is an optical diagram of the ocular and objective members.

2 an inclined position in any suitable manner such as the dovetailed connection 24 suggested in the patent to W. L. Patterson No. 1,862,031. An inclination prism 25, held by suitable means such as a clamping screw 26 in a prism holder 27, is located in the longitudinal chamber 14 in optical alignment with the objective 19 to reflect the light rays therefrom angularly toward the eyepieces 21 and 22. Reflecting prisms 28, 29, and 30 of Fig. 5, housed in the crosswise chamber 15 direct the light rays from the inclination prism 25 into the binocular eyepieces 21 and 22. In the bottom surface of the prism holder 27 an opening 31 is provided concentric with opening 17 to permit light rays to pass therethrough from the objective 19.

In order to convert the instrument from binocular to monocular vision, the prism 25 is slidably mounted to move along the dovetailed guideway 32 which cooperates with the slide 33 carried by prism holder 27. Mechanism for moving the prism holder 27 comprise an extended side flange 34 on holder 27 which has a vertical slot 35 therein engaged by a pin 36 fixed to a crank 37. A shaft 38 fixed at its inner end to the crank 37 is journaled at 38' in the frame member 12 and a knob 39 is fixed on the outer end thereof to turn the crank 37. Stops 40 and 41 on the crank 37 limit its rotary motion in both directions of rotation. The top wall of chamber 14 is provided with a threaded opening 42 which is closed by the plug 43 when the instrument is used for binocular vision. When used for monocular vision, the prism 25 is moved to the dotted line position shown in Fig. 2 so that light rays may pass directly upward from the objective 19 and into a suitable monocular eyepiece which is secured in opening 42 after removal of plug 43.

A vertically adjustable stage 44 on which a specimen may be mounted for examination over a central opening 45 substantially on the optical axis of the instrument is slidably supported by a rigid bracket 46 on a pair of vertical guideways 47 and 48. The sole adjusting and supporting means for the stage are supplied in the form of interdependent adjustment mechanism comprising a coarse adjustment mechanism attached to the stage 44 and a fine adjustment mechanism on which the coarse adjustment mechanism rests. The fine adjustment mechanism includes a block 49 anchored by suitable means such as screws 50 to the inner surface of the frame arm 12. A fine adjustment screw 51 journaled in the closed ends of a sleeve 52, which is solidly held in the block 49, has a nut 53 threaded thereon, the exterior of the nut fitting within a slot 54 in sleeve 52 to prevent its rotation. The nut has a radial transverse surface 55 projecting therefrom which is moved axially along the screw shaft 51 when the shaft is rotated by a knob 56 fixed on the outer end thereof. Pivotally mounted on the block 49 is a bell crank lever 58, the vertical arm of which is in contact with the radial surface 55 of nut 53 so as to provide an operative engagement with the adjusting screw 51. Near the end of a laterally extending arm 59 on the bell crank lever 58 a vertically positioned pin 60, having a bearing point at each end, is seated in a small depression 61. The upper end of the pin is seated in a conical depression 62 located on the under surface of a load block 63 which is fixed by suitable means such as screws 64 to a bearing plate 65. The plate 65 is vertically guided for motion within the frame 10 by V grooves 66 and 67 extending along the side surfaces of the plate and free action therein is assured by providing bearing balls 68 as an anti-friction means between the grooves 66 and 67 of the plate 65 and similar grooves 69 and 70 on the inner surfaces of the frame arm 12.

Figure 4:
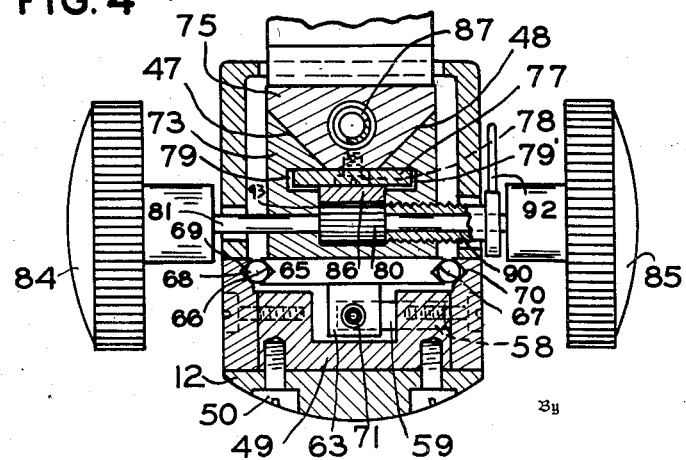
Fig. 4 is a horizontal cross sectional view taken on the line 4—4 of Fig. 2.

A compression spring 71 seated at its ends in recesses 72 and 72' urges the coarse adjustment assembly downward upon the pin 60 so that the bell crank connection is in firm contact with the nut surface 55. On the front side of the bearing plate 65, a V slide 73 is attached in any desired manner such as by screws 74 and a stage slide 75 fitting the V slide 73 is preferably directly connected with the stage bracket 46 by suitable means such as screws 76. The slides 73 and 75 are closely held in contact with a sliding fit therebetween by a retainer plate 77 fixed to the slide 75 by suitable means such as screws 78. The overhanging parts of the retainer plate 77 slidably engage in mating grooves 79 and 79' in the slide 73. For the coarse adjustment of the stage, the slide 75 is moved on slide 73 by means of a pinion 80 secured to shaft 81 journaled in the slide 73 and adapted to be rotated by knobs 84 and 85, Fig. 4. The pinion engages rack 86 attached to slide 75 so that rotation of the shaft 81 will move the slide 75.

In order to substantially relieve the stage adjustment mechanism of the weight of the stage and its load, a spring 87, under a tension tending to raise the stage, has its upper end secured to the frame member 12 at 88 and its lower end secured to the stage 44 at 89.

The stage 44 may be selectively locked in position by means of a sleeve 90 which is positioned coaxially of shaft 81 and is exteriorly threaded to coact with a threaded portion on slide 73. The inner end of the sleeve 90 is in proximity to the end of pinion 80 while the outer end extends beyond the arm 12 and carries the actuating means in the form of pin 92 whereby the sleeve may be rotated. To lock the stage, the sleeve 90 is turned so that the inner end thereof engages the side of pinion 80 and urges the latter against the face 93 on slide 73. The stage may be released by turning or unscrewing the sleeve 90 so that its inner end disengages the pinion 80.

Means for illuminating the specimen under examination through the opening 45 in the stage 44 are provided comprising a unitary substage lighting member generally designated at 95. In the lighting member, a chassis tube 96 has a suitable lamp 97 adjustably mounted therein, the light therefrom being deflected upwardly by a reflector 98 fixed to a closure member 99 which is attached to the end of the tube 96 by suitable means such as screws 100. Light rays leaving the reflector 98 are projected upwardly through the collective lens 101 secured in the closure member 99 substantially on the optical axis of the microscope. Proper optical alignment of the lens 101 on the optical axis of the microscope is assured by forming a radial flange 102 at the rear of the tube 96 so that when the flange is clamped against the frame 10, the lens 101 is correctly located in all directions. A pin 102' anchored in the flange 102 and slidably received in the frame 10 prevents the tube 96 from rotating so as to position the lens 101 with respect to the optical axis.

Figure 6:
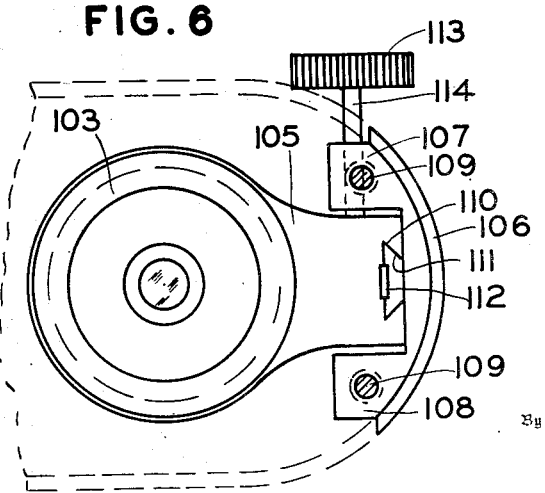
Fig. 6 is a horizontal cross-sectional view taken on the line 6—6 of Fig. 2.

Optical means for condensing the light rays emanating from the collective lens 101 and directing said rays upon the specimen through the opening 45 are provided by a condenser having suitable lenses therein and generally designated by the numeral 103. The condenser 103 is supported by a bracket 105 which is slidably mounted on the rear side of an upright apron 106 which extends across the front of the stage 44 in a dependent position and is secured thereto by the integral horizontal lugs 107 and 108, Fig. 6, through which the screws 109 extend. Apron 106 extends below the level of the lens 101 sufficiently to shelter the eyes of the operator from direct light rays emanating therefrom. The sliding connection between the bracket 105 and the apron 106 is supplied by dovetailed guideways 110 and 111 on the bracket and apron, respectively, as best illustrated in Fig. 6. Relative movement between the bracket and apron guideways 110 and 111 for raising and lowering of the condenser 103 is accomplished by the usual rack and pinion connection 112 with the pinion adapted for rotation by the knob 113 through the pinion shaft 114.

When it is desired to convert the microscope from binocular to monocular vision for photomicrographic purposes or otherwise, the knob 39 is rotated in the direction of the arrow "a" whereupon the crank 37 is swung counterclockwise in Fig. 2 taking the inclination prism 25 with it into the position shown by the dotted lines 115. The screw plug 43 is subsequently removed to permit insertion of any desired monocular optical device such as a camera or eyepiece.

Since the eyepieces and objectives are not mounted for vertical adjustment, the focusing adjustments are effected by moving the stage 44 which carries the object under examination. The adjusting mechanisms are mounted in the hollow stand so that only the substage adjusting means is adjacent the operator and consequently unimpeded access is afforded to the specimen on the stage. The counterbalancing spring 87 tends to raise the stage 44 so that the latter may thereby be adjusted easily and smoothly in either direction. As the substage condenser is adjustably carried by the stage, the adjusting knob 113 is located directly in front of the operator and hence affords great convenience in operation. The illuminating means 95 is built into the stand so that a compact, unitary instrument is thereby provided. The depending apron 106 not only supports the substage condenser but also acts as a shield to prevent stray light rays from passing up towards the eyes of the operator. The stand 12 may be formed of a single, unitary hollow casting since no inclination joint is embodied in the structure.

It will be apparent that I have attained the objects of my invention by providing a microscope which is efficient in operation yet relatively simple in construction so that it may be manufactured at a relatively low cost. Various modifications can obviously be made without departing from the spirit of my invention as pointed out in the appended claims.

I claim:

1. In a microscope, a stand having an overhanging portion, an optical system mounted on said portion, a stage projecting forwardly from and movably mounted on the stand for holding a specimen in alignment with the optical system, means for adjustably moving the stage to bring the specimen into focus, said optical system including eyepiece means having an optical axis which is inclined away from the stand and extends above the front edge of the stage, and means for illuminating a specimen on the stage comprising support means depending from the front edge of the stage, condensing lens means slidably mounted on the support means, a light source in optical alignment with the condensing lens means and a light shield depending from the front of the stage to shield the user's eyes from extraneous light from the source.

2. In a microscope having a stand, optical means carried by the stand, stage means carried by the stand for holding a specimen to be observed through the optical means, one of said means being movable relative to the other means for focusing, and mechanism for moving the movable means including a rack cooperating with a pinion fixed to a shaft, said shaft being rotatably mounted in a bore in the stand, the combination of a sleeve rotatably mounted on the shaft and positioned coaxially therewith, the inner end of the sleeve being positioned adjacent to an end face of said pinion, the other end face of the pinion abutting the stand, the other end of the sleeve projecting outwardly from the stand and having a finger engaging portion, said bore being threaded, said sleeve being in threaded engagement with the bore whereby the inner end of the sleeve may be selectively brought into locking engagement with an end face of the pinion by rotation of the sleeve.

3. A microscope comprising a stand, optical means carried by and forwardly of said stand for forming an enlarged image of a specimen, a movable stage supported by and extending forwardly from its point of support on the stand and having an opening over which the specimen is placed for examination, means including guideways on said stand for slidably mounting said stage thereon, adjustment mechanism for moving the stage vertically to bring the specimen into focus, support means carried solely by said stage and depending from the front edge thereof, the front edge of the stage being remote from the stand, condensing lens means for condensing light rays onto said specimen, said condensing lens means being slidably mounted on the support means, and adjusting means carried by the support means for adjustably moving the condensing lens means for focusing the light rays onto the specimen.

BERNHARDT GEORGE GALLASCH.

REFERENCES CITED

The following references are of record in the file of this patent:

UNITED STATES PATENTS

| Number | Name | Date |
|---|---|---|
| 621,196 | Zirngibl | Mar. 14, 1899 |
| 1,500,030 | Ott | July 1, 1924 |
| 1,690,677 | Guthrie | Nov. 6, 1928 |
| 1,788,712 | Foster | Jan. 13, 1931 |
| 1,807,613 | Bauersfeld et al. | June 2, 1931 |
| 1,862,031 | Patterson | June 7, 1932 |
| 1,958,280 | Patterson et al. | May 8, 1934 |
| 2,003,387 | Ott | June 4, 1935 |
| 2,048,440 | Fassin | July 21, 1936 |
| 2,096,325 | Heine | Oct. 19, 1937 |
| 2,144,653 | Graff | Jan. 24, 1939 |
| 2,365,594 | Roeder | Dec. 19, 1944 |

FOREIGN PATENTS

| Number | Country | Date |
|---|---|---|
| 392,077 | Great Britain | May 11, 1933 |